US005889734A

United States Patent [19]

Sato

[11] Patent Number: 5,889,734

[45] Date of Patent: Mar. 30, 1999

[54] ELECTRONIC TIMEPIECE

[75] Inventor: Koichi Sato, Tanashi, Japan

[73] Assignee: Citizen Watch Co., Ltd., Tokyo, Japan

[21] Appl. No.: 557,084

[22] PCT Filed: Apr. 6, 1995

[86] PCT No.: PCT/JP95/00679

§ 371 Date: Dec. 5, 1995

§ 102(e) Date: Dec. 5, 1995

[87] PCT Pub. No.: WO95/27926

PCT Pub. Date: Oct. 19, 1995

[30] Foreign Application Priority Data

Apr. 6, 1994 [JP] Japan .................................... 6/67523

[51] Int. Cl.[6] .......................... G04C 23/00; G04D 1/00; H02J 7/00

[52] U.S. Cl. .......................... 368/64; 368/66; 368/157; 368/204; 368/205; 320/1

[58] Field of Search .......................... 368/80, 157, 160, 368/203–205, 64, 66; 320/1, 2

[56] References Cited

U.S. PATENT DOCUMENTS

| | | | |
|---|---|---|---|
| 4,634,953 | 1/1987 | Shoji et al. | 320/1 |
| 4,702,613 | 10/1987 | Ohtawa | 368/66 |
| 4,730,287 | 3/1988 | Yoshino et al. | 368/205 |
| 4,760,564 | 7/1988 | Odagiri | 368/66 |
| 4,785,435 | 11/1988 | Inoue et al. | 368/205 |

FOREIGN PATENT DOCUMENTS

| | | |
|---|---|---|
| 53-76069 | 7/1978 | Japan . |
| 53-87768 | 8/1978 | Japan . |
| 57-77984 | 5/1982 | Japan . |
| 58-134100 | 9/1983 | Japan . |
| 61-8392 | 3/1986 | Japan . |
| 61-123991 | 8/1986 | Japan . |
| 62-238484 | 10/1987 | Japan . |
| 62-289785 | 12/1987 | Japan . |
| 4-80689 | 3/1992 | Japan . |
| 4-50548 | 8/1992 | Japan . |

*Primary Examiner*—Vit W. Miska
*Attorney, Agent, or Firm*—Howell & Haferkamp, L.C.

[57] ABSTRACT

In an electronic timepiece using power supply means consisting of a solar cell and an electric double layer capacitor, whose output voltage varies, as a power supply, a plurality of driving pulse preparation means for preparing driving pulses for driving a stepping motor are arranged. Each driving pulse preparation means prepares a driving pulse group having a combination of pulse widths, which combination is different from that of remaining ones of the driving pulse preparation means. A varying output voltage of the power supply means is detected, and one of the plurality of driving pulse preparation means is selected in accordance with the detected output voltage. A driving pulse for minimizing the current consumption is selected and supplied to the drive circuit of the stepping motor. With this arrangement, the stepping motor can always be driven at a minimum current consumption, and the driving time can be prolonged.

33 Claims, 7 Drawing Sheets

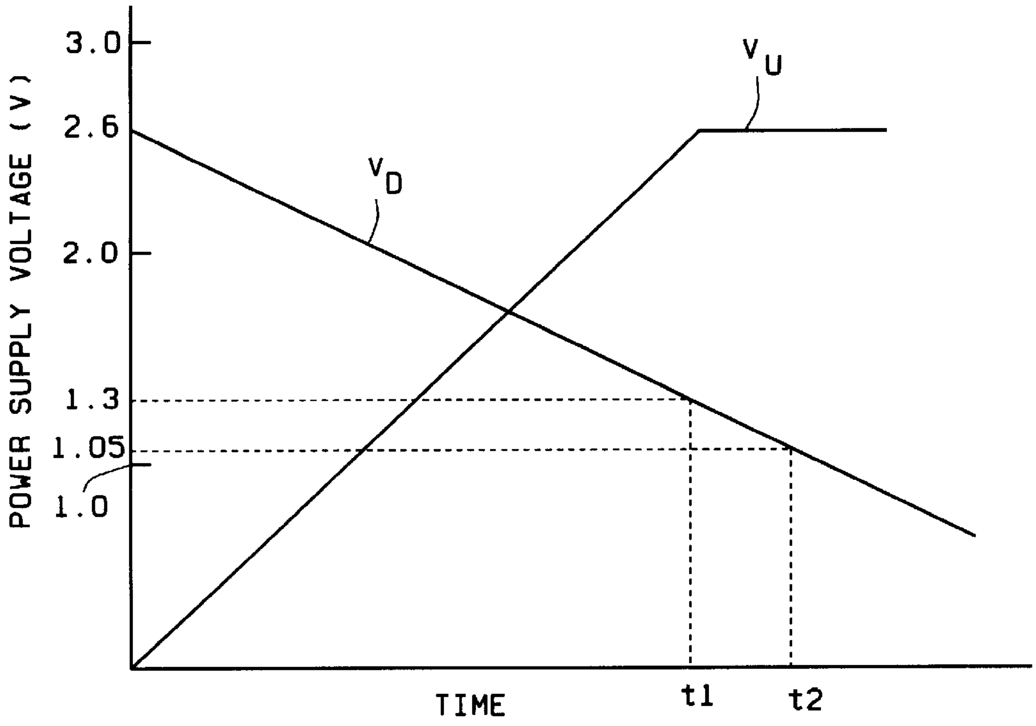
FIG. 1
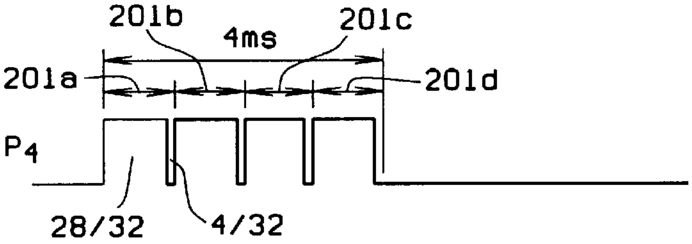
FIG. 3A
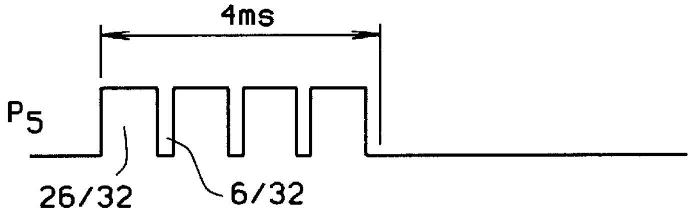
FIG. 3B
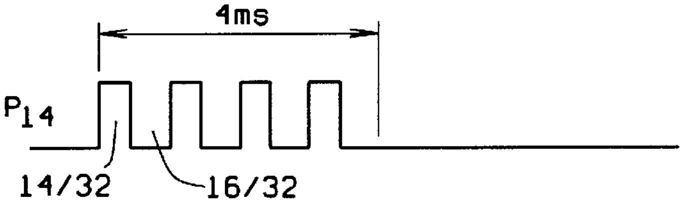
FIG. 3C
FIG. 3D
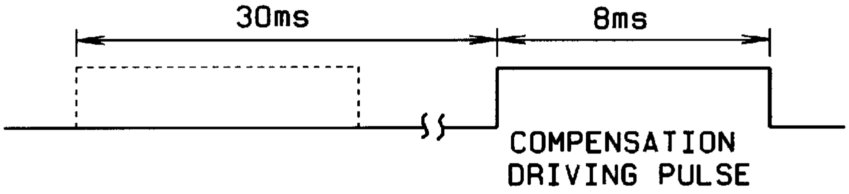

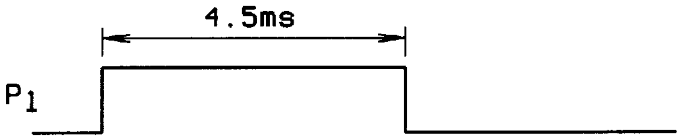
FIG. 7A
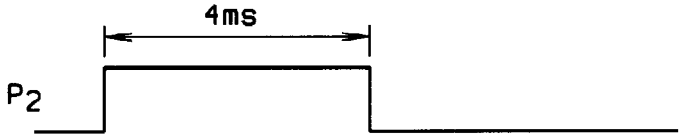
FIG. 7B
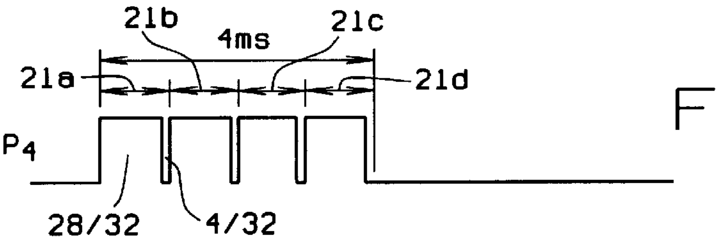
FIG. 7C
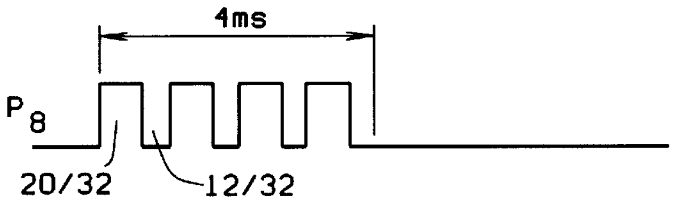
FIG. 7D
FIG. 7E
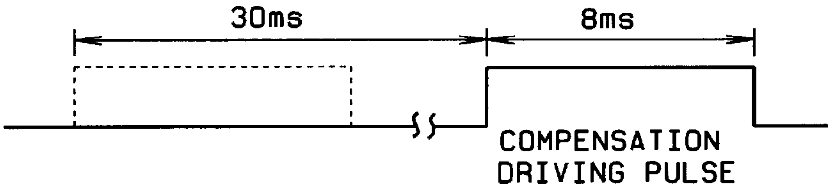
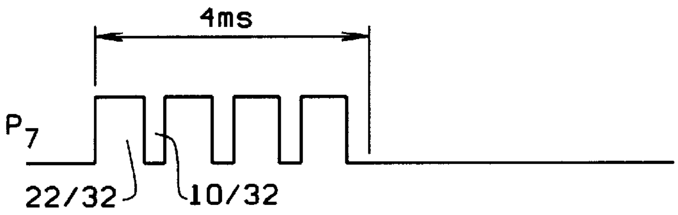
FIG. 8A
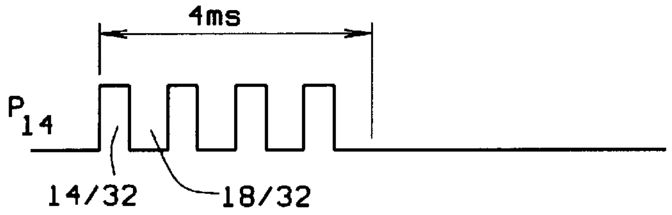
FIG. 8B
FIG. 8C
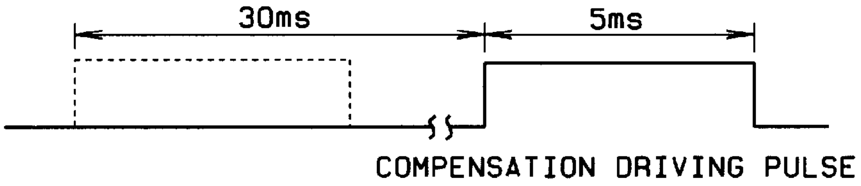

ELECTRONIC TIMEPIECE

TECHNICAL FIELD

The present invention relates to an electronic timepiece which has a power supply whose output voltage is not constant and varies within a certain voltage range, e.g., a power supply consisting of combination of a solar cell and an electric double layer capacitor, and uses a stepping motor as a driving source.

BACKGROUND ART

Conventionally, electronic timepieces are commercially available in which a solar cell is arranged on the dial plate of the timepiece in place of a battery, and the solar cell is combined with an electric double layer capacitor to constitute a power supply, thereby avoiding troublesome battery exchange. However, the output voltage of this power supply using a solar cell varies depending on solar rays or illumination light. More specifically, this power supply is charged upon reception of an optical energy and increases the output voltage. However, when the timepiece load is driven without receiving the optical energy for a long time, e.g., during nighttime, the power is consumed, and the voltage gradually decreases. In the electronic timepiece using this power supply, when the electric double layer capacitor is charged to 2.6 V, and the timepiece load is continuously driven from this state without being charged midway, the output voltage gradually decreases, as shown in FIG. 1.

In a conventional electronic timepiece of this type, the minimum voltage allowing to drive hands as a timepiece load, i.e., the minimum driving voltage is 1.3 V. For this reason, the driving time is $t_1$, as indicated by $V_D$ in FIG. 1. However, the electric circuit of the electronic timepiece can operate at a lower voltage of about 0.8 V. Therefore, when a large hand driving pulse necessary for driving the hands is independently prepared, the minimum driving voltage can be decreased up to 1.05 V. As a result, the driving time can be increased to $t_2$, as is apparent from FIG. 1. This means that the electronic timepiece does not stop for a long time even when it is left in an uncharged state, and the charge during the discharge prolongs the driving time, resulting in an increase in product value of electronic timepieces.

From such a viewpoint, an electronic timepiece having a circuit arrangement as shown in FIG. 2 can be considered by applying a pulse width change driving technique disclosed in Japanese Examined Patent Publication No. 61-15386 to an electronic timepiece using a power supply formed of a combination of a solar cell and an electric double layer capacitor.

Referring to FIG. 2, reference numeral 40 denotes a power supply means constituted by a solar cell 1 serving as a power generation means, and an electric double layer capacitor 2 serving as an accumulation means, which serves as a power supply for an electronic timepiece. Reference numeral 4 denotes a quartz oscillation circuit; 5, a time counting circuit; 107, a pulse preparation circuit; and 108, a pulse selection circuit. The pulse preparation circuit 107 and the pulse selection circuit 108 constitute a driving pulse preparation means 109. Reference numeral 11 denotes a driver circuit; 12, a rotation detection circuit; and 13, a stepping motor. The solar cell 1 is arranged on the dial plate of the timepiece to convert an external optical energy into an electric energy. The electric double layer capacitor 2 accumulates the electric energy generated in the solar cell 1 and supplies the power to a timepiece circuit 100 including the quartz oscillation circuit 4, the time counting circuit 5, the pulse preparation circuit 107, the pulse selection circuit 108, the driver circuit 11, and the rotation detection circuit 12. The quartz oscillation circuit 4 outputs a 32,768-Hz signal on the basis of a vibration of the quartz oscillator. The time counting circuit 5 frequency-divides the 32,768-Hz signal output from the quartz oscillation circuit 4 and outputs a signal necessary for preparing a driving pulse or a signal at a one-second period which is a timing for rotating the stepping motor 13 to the pulse preparation circuit 107. The pulse preparation circuit 107 prepares driving pulses having various pulse widths as will be described later and outputs the driving pulses to the pulse selection circuit 108. The pulse selection circuit 108 selects only one appropriate driving pulse from the driving pulses having various pulse widths, which are prepared by the pulse preparation circuit 107, on the basis of a signal output from the rotation detection circuit 12 and outputs the driving pulse to the driver circuit 11. The driver circuit 11 drives the stepping motor 13 in accordance with the signal output from the pulse selection circuit 108. The rotation detection circuit 12 detects a rotation or non-rotation state of the stepping motor 13 and outputs the information to the pulse selection circuit 108. When the power generation voltage of the solar cell 1 exceeds 2.6 V, a discharge circuit (not shown) operates to prevent a voltage of 2.6 V or more, i.e., the breakdown from being applied to the electric double layer capacitor 2.

Driving pulses prepared by the pulse preparation circuit 107 will be described below.

FIG. 3 shows waveform charts of driving pulses prepared by the pulse preparation circuit 107. FIGS. 3*a*–3*c* show three driving pulses of the eight driving pulses, each having different pulse widths, which are prepared by the pulse preparation circuit 107. Each driving pulse is output at a timing of one second. FIG. 3*d* shows a compensation driving pulse which is also prepared by the pulse preparation circuit 107 and output when the timepiece load, i.e., the stepping motor 13 cannot be driven with the above driving pulses. The compensation driving pulse is a pulse having a width of 8 ms and output 30 ms after a normal driving pulse is output.

For the driving pulse shown in FIG. 3*a* of FIG. 3, a pulse width of 4 ms is divided into four equal portions 201*a*, 201*b*, 201*c*, and 201*d*. Each of the portions 201*a*, 201*b*, 201*c*, and 201*d* is further divided into 32 equal portions. The pulse is output during the first 28/32 period, and no pulse is output during the remaining 4/32 period (this is expressed as a "28/32 driving pulse"). Similarly, FIG. 3*b* shows a "26/32 driving pulse". In this prior art, 24/32, 22/32, 20/32, 18/32, 16/32, and 14/32 driving pulses are prepared additionally. That is, a total of eight driving pulses $P_4$, $P_5$, $P_6$, $P_7$, $P_8$, $P_{10}$, $P_{12}$, and $P_{14}$ are prepared, as shown in Table 1 below. As a matter of course, when the stepping motor 13 can be driven with these driving pulses, no compensation driving pulse is output.

TABLE 1

| Driving Pulses | Minimum Driving Voltages |
|---|---|
| $P_4$ 28/32 | 1.24 V |
| $P_5$ 26/32 | 1.33 V |
| $P_6$ 24/32 | 1.45 V |
| $P_7$ 22/32 | 1.56 V |
| $P_8$ 20/32 | 1.74 V |
| $P_{10}$ 18/32 | 1.92 V |
| $P_{12}$ 16/32 | 2.14 V |
| $P_{14}$ 14/32 | 2.43 V |

Table 1 shows the eight driving pulses and their minimum driving voltages. For example, the minimum driving voltage of the "28/32 driving pulse" (driving pulse $P_4$) is 1.24 V. This means that the driving pulse $P_4$ can drive the stepping motor 13 at only a voltage of 1.24 V or more (of course, at or below 2.6 V, i.e., the breakdown voltage of the electric double layer capacitor) and cannot drive the stepping motor 13 at a voltage lower than 1.24 V. Similarly, the driving pulses $P_5$, $P_6$, $P_7$, $P_8$, $P_{10}$, $P_{12}$ and $P_{14}$ have the minimum driving voltages as shown in Table 1, respectively. In FIG. 4, the minimum driving voltages for the driving pulses $P_4$, $P_5$, $P_6$, $P_7$, $P_8$, $P_{10}$, $P_{12}$, and $P_{14}$ are represented by small white dots. FIG. 4 shows a maximum charge voltage $V_{MAX}$ (actually 2.6 V) which is determined by the breakdown voltage of the electric double layer capacitor 2 constituting the power supply, and an operation limit voltage $V_{L2}$ (actually 1.3 V) taking a calendar load and the like into consideration. The pulse widths of the driving pulses $P_4$ to $P_{14}$ are set to cover this voltage range.

As is apparent from FIG. 4, a driving pulse having a large pulse width has a low minimum driving voltage. To the contrary, a driving pulse having a small pulse width can drive the pulse motor at only a high voltage. In addition, the current consumption is minimized in driving at a voltage slightly higher (0.01 to 0.02 V) than the minimum driving voltage of each driving pulse. When the voltage becomes higher beyond that, the current consumption also increases.

When the motor is driven with a driving pulse having a certain pulse width, and the power supply voltage becomes higher than the minimum driving voltage of the next driving pulse having a pulse width larger than that of the present driving pulse by one level, the current consumption decreases in driving with the driving pulse having the larger pulse width. For example, the driving pulse $P_4$ can drive the timepiece load at a voltage of 1.24 V or more. However, when the power supply voltage is 1.33 V or more, the current consumption decreases in driving with the driving pulse $P_5$ having a pulse width smaller than that of the driving pulse $P_4$ by one level. Therefore, within a power supply voltage range of 1.24 V to 1.33 V, the current consumption can be minimized in driving with the driving pulse $P_4$. As for the remaining driving pulses as well, within a voltage range from the minimum driving voltage of each driving pulse to that of the driving pulse having a pulse width smaller by one level, the current consumption is minimized in driving with the driving pulse having the smaller pulse width.

An operation performed when the conventional electronic timepiece is driven using such a driving pulse will be described below.

Assume that the power supply voltage is 1.8 V. As is apparent from Table 1, when the power supply voltage is 1.8 V, the driving pulse $P_8$ minimizes the current consumption. However, if the driving pulse $P_5$ is output at this time, the current consumption excessively becomes large. Therefore, the driving pulse must be changed to the driving pulse $P_8$ to decrease the current consumption. The method will be described below.

As described above, the driving pulse $P_5$ is output, which has a sufficiently large driving force. Therefore, the stepping motor 13 is rotated, and the rotation detection circuit 12 detects the rotation state of the stepping motor 13 and outputs a rotation detection signal to the pulse selection circuit 108. Upon reception of this rotation detection signal, the pulse selection circuit 108 continuously outputs the driving pulse $P_5$ as the next driving pulse. Similarly, the driving pulse $P_5$ is continuously output during a predetermined period of time in this example, i.e., 200 seconds. After that, the driving pulse is finally switched to the "24/32 driving pulse" having a pulse width smaller than that of the driving pulse $P_5$ by one level, i.e., the driving pulse $P_6$. Subsequently, the same operation is repeated a number of times. After 200 seconds, the driving pulse is switched to the driving pulse $P_7$ having a smaller pulse width. The "20/32 driving pulse" for allowing driving at a power supply voltage of 1.8 V and a minimum current consumption, i.e., the driving pulse $P_8$ is finally set.

After driving with the driving pulse $P_8$ for 200 seconds, the pulse selection circuit 108 switches to the "18/32 driving pulse" having a pulse width smaller by one more level, i.e., the driving pulse $P_{10}$. As is apparent from FIG. 4, however, the driving pulse $P_{10}$ has only a small driving force at a driving voltage of 1.8 V, so the stepping motor 13 cannot be driven and is set in a non-rotation state. The rotation detection circuit 12 detects the non-rotation state of the stepping motor 13 and outputs a non-rotation detection signal to the pulse selection circuit 108. As a result, the pulse selection circuit 108 immediately outputs the compensation driving pulse as shown in FIG. 3*d*, which has a sufficiently large driving force for driving the stepping motor 13, switches to the driving pulse $P_8$ having a pulse width larger than that of the driving pulse $P_{10}$ by one step, and outputs the driving pulse $P_8$ as the next driving pulse. The driving pulse $P_8$ is output for 200 seconds. During this time, the stepping motor 13 is continuously driven with the driving pulse $P_8$, and this state is then maintained. Until this point of time, one driving pulse $P_{10}$ and one compensation driving pulse are output. Although the current consumption of the compensation driving pulse is large, the compensation driving pulse is output every 200 seconds, so no problem of power consumption is posed. In this manner, a stable state is set by outputting a driving pulse suitable for the power supply voltage (1.8 V in the above example), and the current consumption can be kept small.

A case wherein the power supply voltage varies will be described below.

Assume that the power supply voltage increases to 2.2 V during driving with the driving pulse $P_8$ at a power supply voltage of 1.8 V. As is apparent from Table 1, the driving pulse for minimizing the current consumption at a voltage of 2.2 V is the "16/32 driving pulse", i.e., the driving pulse $P_{12}$. The pulse selection circuit 108 outputs the driving pulse $P_8$ at a voltage of 2.2 V for 200 seconds, and thereafter, switches to the driving pulse $P_{10}$ having a pulse width smaller by one level. After the driving pulse $P_{10}$ is output for 200 seconds, the driving pulse is switched to the driving pulse $P_{12}$ having a pulse width smaller by one level.

To the contrary, assume that the power supply voltage decreases to 1.6 V in driving with the driving pulse $P_8$ at a power supply voltage of 1.8 V. In this case, driving with the driving pulse $P_8$ so far is disabled. Therefore, a compensation driving pulse is temporarily output, and thereafter, the driving pulse is switched to the driving pulse $P_7$ having a pulse width larger by one level.

In this manner, the driver circuit 11 can change the type of the output driving pulse to drive the load at the minimum current consumption even when the power supply voltage varies. The pulse preparation circuit 107 prepares the eight driving pulses capable of coping with the total voltage variation range of a predetermined power supply voltage. The above operation also copes with variations in timepiece load such as calendar updating.

For the electronic timepiece employing the above-described pulse width change driving technique, abnormal phenomena are known such that, when the voltage value for each driving pulse is excessively large, the stepping motor 13 causes a two-second skip or return by a reaction. A voltage which causes such an abnormal phenomenon will be referred to as an abnormality generation voltage. Abnormality generation voltages $V_{04}$ (about 2.7 V) and $V_{05}$ for the driving pulses $P_4$ and $P_5$ have values as shown in FIG. 4. However, as described above, in the electronic timepiece using a power supply formed of a combination of a solar cell and an electric double layer capacitor, the maximum charge voltage $V_{MAX}$ is designed not to exceed 2.6 V because of the breakdown voltage of the electric double layer capacitor. For this reason, the abnormality generation voltage $V_{04}$ of about 2.7 V for the driving pulse $P_4$ or the higher abnormality generation voltage $V_{05}$ for the driving pulse $P_5$ is not actually generated. Therefore, the abnormal phenomena of the stepping motor 13 do not occur.

However, as described above with reference to FIG. 1, the driving time of the timepiece, can be increased by adding the driving pulse $P_1$ having a minimum driving voltage of 1.0 V, to the pulse group shown in FIG. 4. In this case, since an abnormality generation voltage $V_{01}$ for this driving pulse $P_1$ is 2.3 V which is lower than the maximum charge voltage $V_{MAX}$, this voltage can be actually generated by the power supply. For this reason, if the power supply voltage becomes higher than this abnormality generation voltage $V_{01}$ (2.3 V) due to some reason while the driving pulse $P_1$ is selected, the stepping motor 13 cannot perform a normal rotation operation. This may cause an abnormal phenomenon such as a two-second skip or return by a reaction.

The present invention has been made in consideration of the above situation, and has as its object to provide an electronic timepiece such as a solar timepiece having a power supply constituted by a power generation element and a charge element such as an electric double layer capacitor, whose output voltage is not constant and varies within a certain voltage range to supply a power, wherein the electronic timepiece can cover a large width of the power supply voltage and increase the driving time.

The gist of the present invention to achieve the above object is characterized in that a plurality of driving pulse preparation means for continuously changing the pulse widths within the range of the varying power supply voltage are arranged, and the plurality of driving pulse preparation means are continuously operated.

The applicant has already proposed an electronic timepiece having a plurality of driving pulse preparation means in Japanese Unexamined Patent Publication No. 57-77984. However, unlike the electronic timepiece using a solar cell as a power supply, this technique is associated with an electronic timepiece capable of independently coping with a silver storage battery having a power supply voltage of 1.55 V and a lithium battery having a power supply voltage of 3 V. In this technique, as shown in FIG. 5, a driving pulse group A corresponding to the silver storage battery and a driving pulse group B corresponding to the lithium battery are independently prepared. The voltage level of the battery loaded in the timepiece is determined. In accordance with the determined level, either the driving pulse group A or the driving pulse group B is selected, and driving pulses having different pulse widths are output in accordance with variations in load.

On the other hand, according to present invention, an electronic timepiece using a power supply whose output voltage largely varies within a certain range, such as a power supply constituted by a combination of a solar cell and an electric double layer capacitor, copes with variations in voltage and variations in loads by switching the pulse width of the driving pulse. Therefore, the object is different from that of the technique disclosed in Japanese Unexamined Patent Publication No. 57-77984.

DISCLOSURE OF INVENTION

According to the present invention, there is provided an electronic timepiece having power supply means constituted by power generation means and accumulation means for accumulating a power generated by the power generation means, a stepping motor, a driver circuit for outputting a drive signal to the stepping motor, rotation detection means for detecting a rotation state or a non-rotation state of the stepping motor, and driving pulse preparation means for preparing a driving pulse output to the driver circuit and outputting a compensation driving pulse when the non-rotation state is detected by the rotation detection means, the driving pulse preparation means preparing a plurality of driving pulses having different pulse widths, characterized by comprising voltage detection means for detecting a voltage of the power supply means, wherein the driving pulse preparation means consists of a plurality of driving pulse preparation means, each driving pulse preparation means having pulse group selection means for preparing a driving pulse group having a combination of pulse widths, which combination is different from that of remaining ones of the driving pulse preparation means, and selectively connecting the plurality of driving pulse preparation means to the driver circuit, and a selection operation of the pulse group selection means is controlled in accordance with an output signal from the voltage detection circuit.

An electronic timepiece according to the present invention is further characterized in that the plurality of driving pulse preparation means have first driving pulse preparation means selected when a voltage detected by the voltage detection means is lower than a predetermined value, and second driving pulse preparation means selected when the detected voltage is higher than the predetermined value.

An electronic timepiece according to the present invention is further characterized in that each of the first driving pulse preparation means and the second driving pulse preparation means has a combination in which the pulse widths of the driving pulses continuously change, and the combination of the pulse widths of the driving pulses prepared by the first driving pulse preparation means and the combination of the pulse widths of the driving pulses prepared by the second driving pulse preparation means continuously change.

An electronic timepiece according to the present invention is further characterized in that the combination of the pulse widths of the driving pulses prepared by the first driving pulse preparation means and the combination of the pulse widths of the driving pulses prepared by the second driving pulse preparation means include boundary driving pulses having the same pulse width.

An electronic timepiece according to the present invention is further characterized in that the predetermined value serving as a reference for the pulse group selection means to switch the first driving pulse preparation means and the second driving pulse preparation means is set to a level near a limit voltage capable of driving the stepping motor with the pulse width of the boundary driving pulse.

BRIEF DESCRIPTION OF DRAWINGS

FIG. 1 is a graph showing the output voltage characteristics of a power supply constituted by a solar cell and an electric double layer capacitor.

FIG. 3 shows the waveform charts of driving pulses used in the conventional pulse width change driving control, in which FIGS. 3*a*–3*c* show the waveforms of three driving pulses having different pulse widths, and FIG. 3*d* shows the waveform of a compensation driving pulse.

FIG. 7 shows the waveform charts of a first driving pulse group prepared by a first pulse preparation circuit of an embodiment of the present invention, in which FIGS. 7*a*–7*d* show the waveforms of driving pulses having different pulse widths, and FIG. 7*e* shows the waveform of a compensation driving pulse.

FIG. 8 shows the waveform charts of a second driving pulse group prepared by a second pulse preparation circuit of an embodiment of the present invention, in which FIGS. 8*a* and 8*b* show the waveforms of driving pulses having different pulse widths, and FIG. 8*c* shows the waveform of a compensation driving pulse.

BEST MODE OF CARRYING OUT THE INVENTION

The present invention will be described below in more detail with reference to the accompanying drawings.

Figure 2:
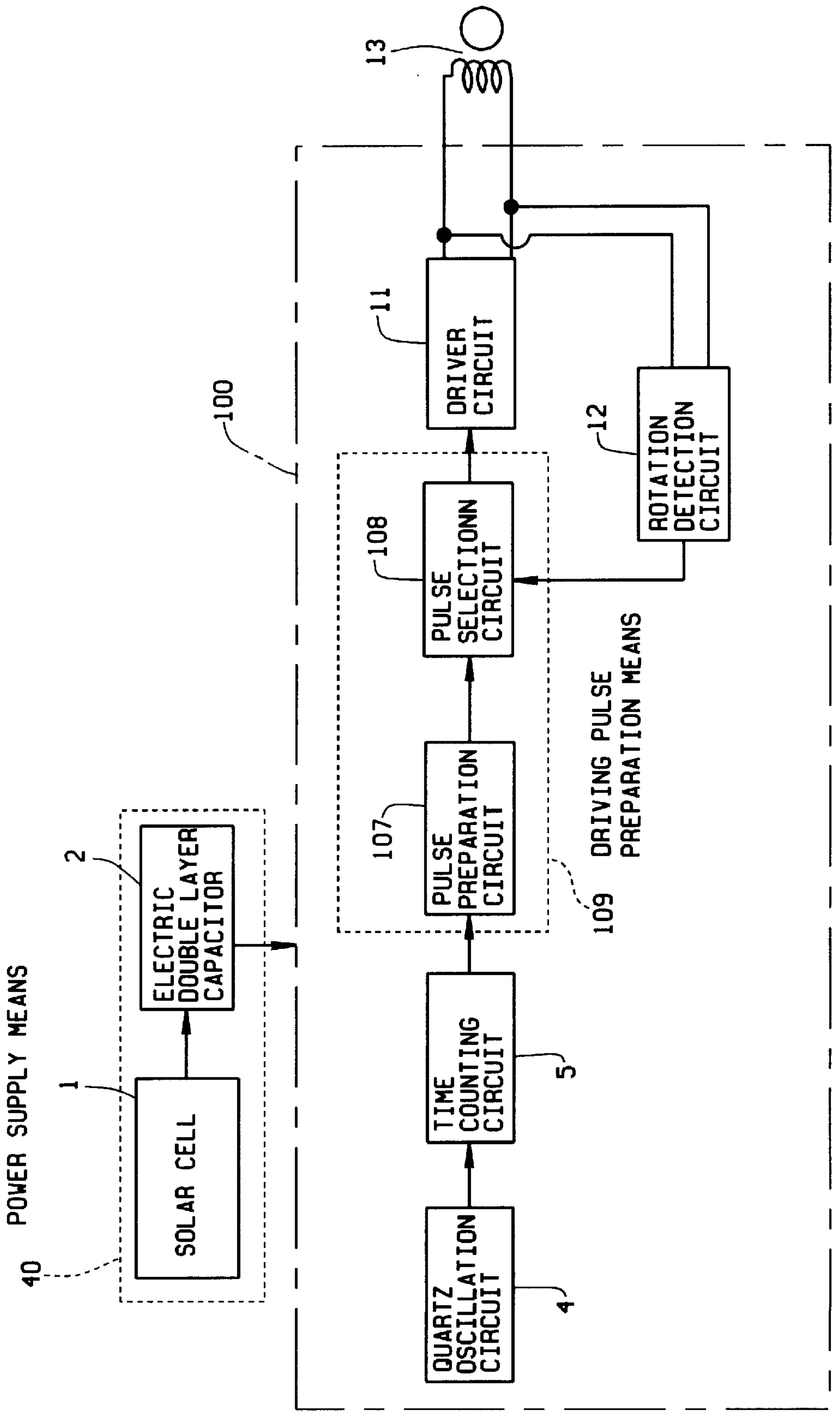
FIG. 2 is a block diagram showing the circuit arrangement of a conventionally available electronic timepiece which uses the power supply constituted by the solar cell and the electric double layer capacitor and employs pulse width change driving control.
Figure 4:
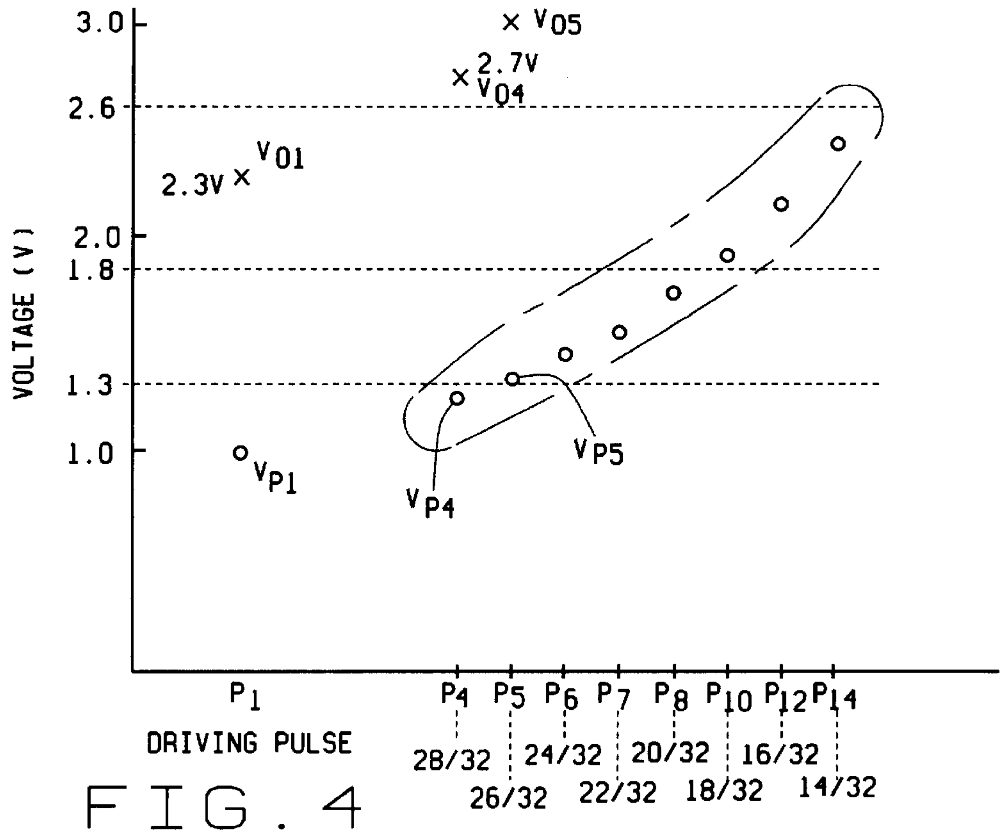
FIG. 4 is a graph showing a plurality of driving pulses used in the conventional pulse width change driving control and their abnormality generation voltages.
Figure 5:
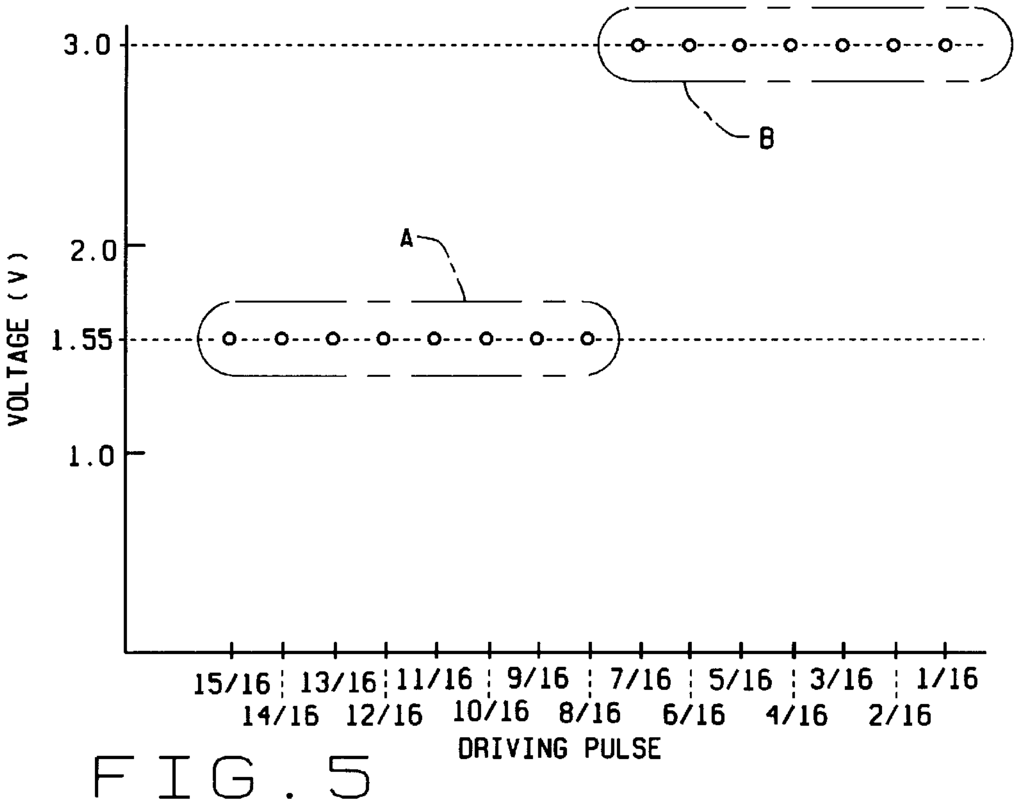
FIG. 5 is a graph showing a driving pulse group used in pulse width change driving control for a conventional electronic timepiece using two batteries having different voltage values.
Figure 6:
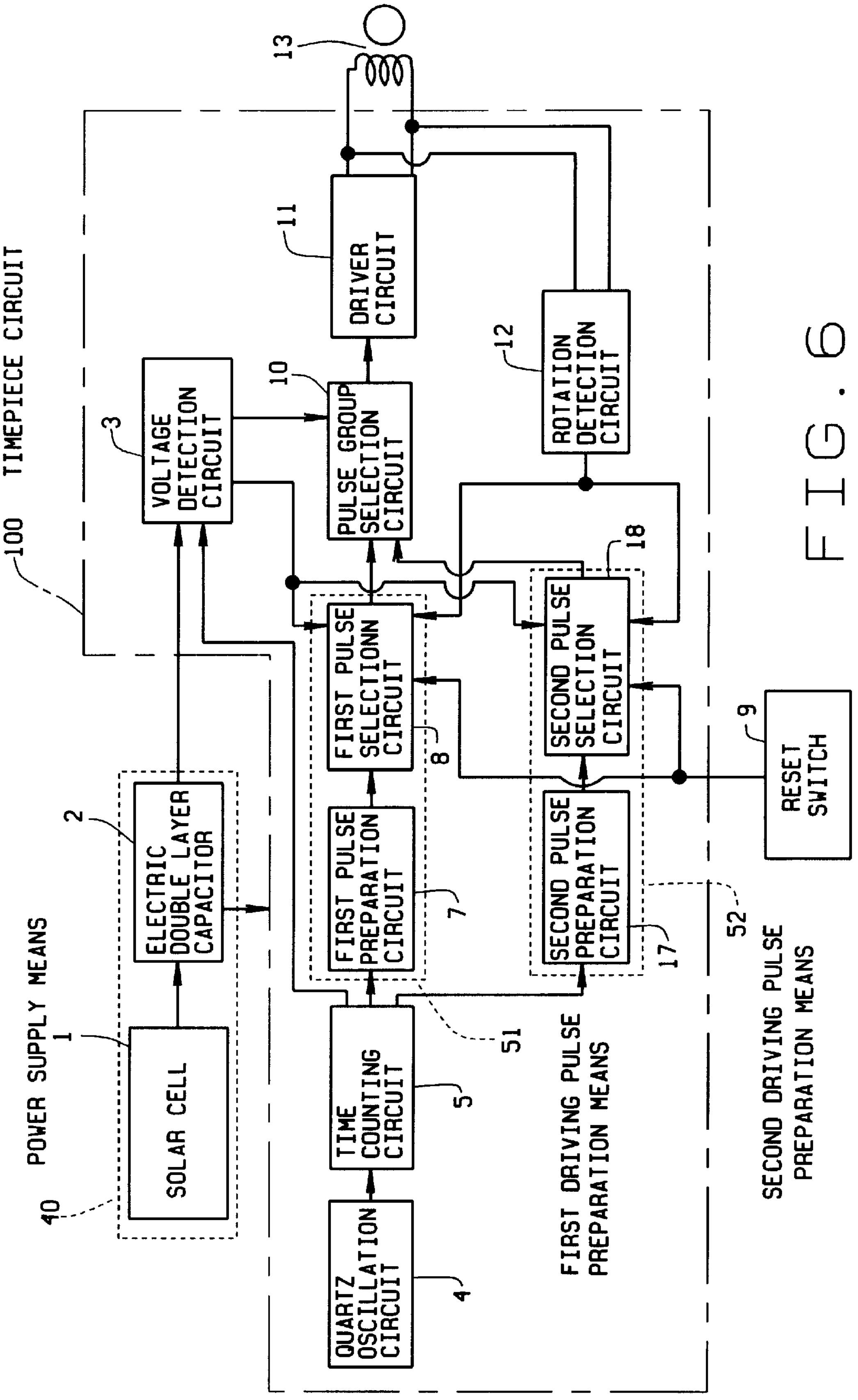
FIG. 6 is a block diagram showing the circuit arrangement of an embodiment of an electronic timepiece according to the present invention.

FIG. 6 is a block diagram of the circuit arrangement of an embodiment of an electronic timepiece according to the present invention. The same reference numerals as in FIG. 2 denote the same constituent elements in FIG. 6, and a detailed description thereof will be omitted. In this embodiment, in place of the driving pulse preparation circuit 109 of the electronic circuit shown in FIG. 2, a first driving pulse preparation means 51 constituted by a first pulse preparation circuit 7 and a first pulse selection circuit 8, and a second driving pulse preparation means 52 constituted by a second pulse preparation circuit 17 and a second pulse selection circuit 18 are arranged, and a voltage detection circuit 3, a reset switch 9, and a pulse group selection circuit 10 are added. The remaining circuit arrangement (indicated by a chain line) except for the reset switch 9 is a timepiece circuit 100.

The voltage detection circuit 3 detects the output voltage of an electric double layer capacitor 2, determines whether the output voltage is 1.8 V or more, or smaller than 1.8 V, and transmits this information to the pulse group selection circuit 10 (to be described later). The first pulse preparation circuit 7 prepares eight driving pulses $P_1$ to $P_8$ having different pulse widths (to be described later) on the basis of a signal output from a time counting circuit 5 and outputs the driving pulses to the first pulse selection circuit 8. The first pulse selection circuit 8 selects, on the basis of a signal output from a rotation detection circuit 12, an appropriate driving pulse from the eight driving pulses $P_1$ to $P_8$ prepared by the first pulse preparation circuit 7, and outputs the driving pulse to the pulse group selection circuit 10.

The second pulse preparation circuit 17 prepares eight driving pulses $P_7$ to $P_{14}$ having different pulse widths (to be described later) on the basis of a signal output from the time counting circuit 5 and outputs the driving pulses to the second pulse selection circuit 18. The second pulse selection circuit 18 selects, on the basis of a signal output from the rotation detection circuit 12, an appropriate driving pulse from the eight driving pulses $P_7$ to $P_{14}$ prepared by the second pulse preparation circuit 17, and outputs the driving pulse to the pulse group selection circuit 10. The pulse group selection circuit 10 outputs a driving pulse output from the first pulse selection circuit 8 to a driver circuit 11 when the power supply voltage is determined to be smaller than 1.8 V in accordance with a signal from the voltage detection circuit 3, or outputs a driving pulse output from the second pulse selection circuit 18 to the driver circuit 11 when the power supply voltage is 1.8 V or more. The driver circuit 11 drives a stepping motor 13 in accordance with the driving pulse output from the pulse group selection circuit 10. The rotation detection circuit 12 detects a rotation or non-rotation state of the stepping motor 13 and outputs the information to the first pulse selection circuit 8 and the second pulse selection circuit 18. When the output voltage of the solar cell 1 becomes 2.6 V which is the breakdown voltage of the electric double layer capacitor 2, a discharge circuit (not shown) operates to prevent the voltage from exceeding 2.6 V.

The shapes of driving pulses prepared by the first pulse preparation circuit 7 will be described below.

FIG. 7 shows the waveforms of driving pulses prepared by the first pulse preparation circuit 7. All the driving pulses are output at a timing of one second. FIG. 7*a* shows the driving pulse $P_1$ having a pulse width of 4.5 ms, which is a driving pulse having the maximum pulse width prepared by the first pulse preparation circuit 7 with the exception of the compensation driving pulse. FIG. 7*b* shows the driving pulse $P_2$ having a pulse width of 4.0 ms. FIG. 7*c* shows the 28/32 driving pulse $P_4$ in which a pulse width of 4 ms is divided into four equal portions 21*a*, 21*b*, 21*c*, and 21*d*, and each of the portions 21*a*, 21*b*, 21*c*, and 21*d* is divided into 32 equal portions. The pulse is output during only the first 28/32 period, and no pulse is output during the remaining 4/32 period. Similarly, 26/32, 24/32, and 22/32 driving pulses $P_5$, $P_6$, and $P_7$, and the "20/32 driving pulse" $P_8$ shown in FIG. 7*d* are prepared. That is, together with the driving pulse $P_1$ having a pulse width of 4.5 ms and the driving pulse $P_2$ having a pulse width of 4.0 ms, a total of eight driving pulses are prepared. Table 2 shows the eight driving pulses $P_1$ to $P_8$, and their minimum driving voltages.

TABLE 2

| Driving Pulses | Minimum Driving Voltages |
|---|---|
| $P_1$ 4.5 ms | 1.00 V |
| $P_2$ 4.0 ms | 1.10 V |
| $P_3$ 30/32 | 1.18 V |
| $P_4$ 28/32 | 1.24 V |
| $P_5$ 26/32 | 1.33 V |
| $P_6$ 24/32 | 1.45 V |
| $P_7$ 22/32 | 1.56 V |
| $P_8$ 20/32 | 1.74 V |

The way of reading the table is the same as for Table 1 showing the conventional driving pulses. In Table 2, the driving pulse $P_1$ having a pulse width of 4.5 ms can drive the stepping motor 13 at a voltage of 1.00 V or more, and cannot drive the stepping motor 13 at a voltage lower than 1.00 V. Similarly, the driving pulses $P_2$, $P_3$, $P_4$, $P_5$, $P_6$, $P_7$, and $P_8$ respectively have pulse widths of "4 ms", "30/32", "28/32", "26/32", "24/32", "22/32", and "20/32", as shown in Table 2. A driving pulse having a large pulse width enables driving at a low voltage. To the contrary, a driving pulse having a small pulse width enables driving at only a high voltage. In addition, the current consumption is minimized in driving at a voltage slightly higher (0.01 to 0.02 V) than the minimum driving voltage of each driving pulse. When the voltage becomes higher beyond that, the current consumption also increases. When the load is driven with a certain driving pulse, and the power supply voltage becomes higher than the minimum driving voltage of the next driving pulse having a pulse width smaller by one level, the current consumption is minimized in driving with the driving pulse having the pulse width smaller by one level. For example, the driving pulse $P_4$ enables driving at a voltage of 1.24 V or more. However, when the driving voltage for the driving pulse $P_4$ becomes 1.33 V or more, the current consumption is minimized in driving with the next driving pulse $P_5$. Therefore, within a driving voltage range of 1.24 V to 1.33 V, the current consumption can be minimized in driving with the driving pulse $P_4$. In driving with the remaining driving pulses as well, the current consumption is minimized in driving within a voltage range from the minimum driving voltage of each driving pulse to that of the next driving pulse having a pulse width smaller by one level.

FIG. 7*e* shows a compensation driving pulse output when driving with the above driving pulses $P_1$ to $P_8$ is disabled. The compensation driving pulse is a pulse having a pulse width of 8 ms and output 30 ms after a normal driving pulse is output. This compensation driving pulse is not output when driving with any one of the driving pulses $P_1$ to $P_8$ is possible, as a matter of course. Although not illustrated, this compensation driving pulse partially has a period after 5 ms, during which no pulse is output to prevent an abnormal operation.

Upon an operation with the crown for correcting the time, the reset switch 9 is switched to set the driving pulse $P_1$ selected by the first pulse selection circuit 8. When the power supply voltage changes to switch the second pulse selection circuit 18 to the first pulse selection circuit 8, the first pulse selection circuit 8 outputs the driving pulse $P_8$.

FIG. 8 shows the waveform charts of driving pulses prepared by the second pulse preparation circuit 17. FIG. 8*a* shows the "22/32" driving pulse $P_7$. In addition to this driving pulse $P_7$, eight driving pulses $P_8$, $P_9$, $P_{10}$, $P_{11}$, $P_{12}$, $P_{13}$, and $P_{14}$, i.e., "20/32", "19/32", "18/32", "17/32", "16/32", and "15/32" driving pulses, and a "14/32" driving pulse shown in FIG. 8*b* are prepared. FIG. 8*c* shows a compensation driving pulse output when driving with any one of the driving pulses $P_7$ to $P_{14}$ is disabled. The compensation driving pulse is a pulse having a width of 5 ms and output 30 ms after a driving pulse is output. This compensation driving pulse also partially has a period after 3 ms, during which no pulse is output to prevent an abnormal operation. When driving with any one of the driving pulses is possible, the compensation driving pulse is not output, as a matter of course. The compensation driving pulse output from the second driving pulse preparation means 52 is shorter than that output from the first driving pulse preparation means 51. This is because the second driving pulse preparation means 52 is driven within a high voltage range and has a sufficient driving force even in a small length.

Upon an operation of the crown for correcting the time, the reset switch 9 is switched to set the driving pulse selected by the second pulse selection circuit 18 to the "20/32" driving pulse as an initial value. In addition, when the power supply voltage changes to switch the first pulse selection circuit 8 to the second pulse selection circuit 18, the second pulse selection circuit 18 outputs the driving pulse $P_8$.

Table 3 shows the relationship between the driving pulse group $P_7$ to $P_{14}$ prepared by the second pulse preparation circuit 17 and their minimum driving voltages. As is apparent from Tables 2 and 3, both the first pulse preparation circuit 7 and the second pulse preparation circuit 17 prepare the driving pulse $P_7$ and the driving pulse $P_8$.

TABLE 3

| Driving Pulses | Minimum Driving Voltages |
|---|---|
| $P_7$ 22/32 | 1.56 V |
| $P_8$ 20/32 | 1.74 V |
| $P_9$ 19/32 | 1.86 V |
| $P_{10}$ 18/32 | 1.92 V |
| $P_{11}$ 17/32 | 2.03 V |
| $P_{12}$ 16/32 | 2.14 V |
| $P_{13}$ 15/32 | 2.28 V |
| $P_{14}$ 14/32 | 2.43 V |

Figure 9:
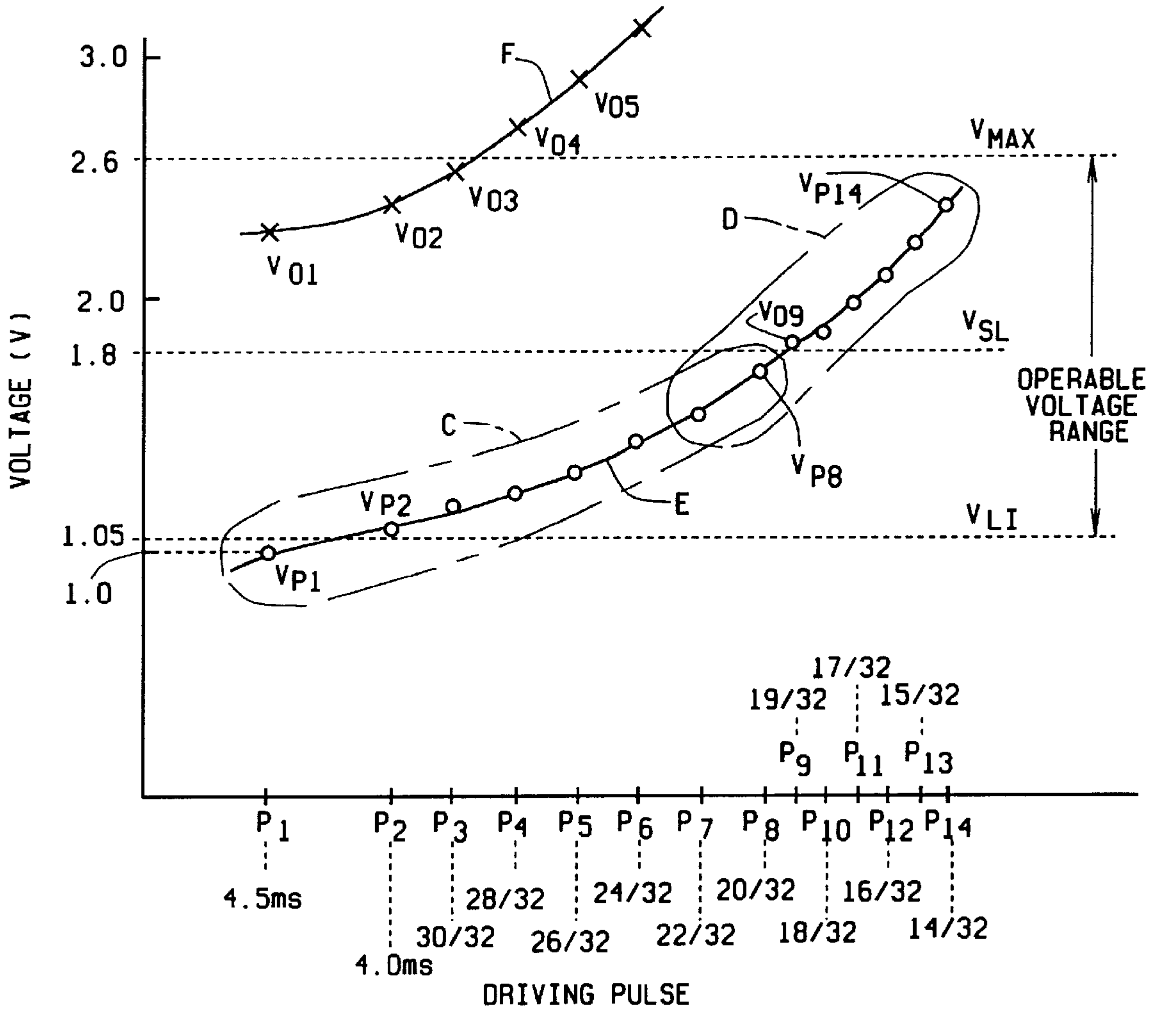
FIG. 9 is a graph showing the first driving pulse group prepared by the first pulse preparation circuit and the second driving pulse group prepared by the second pulse preparation circuit together with the minimum driving voltages of the respective driving pulses.

FIG. 9 is a graph showing voltage vs. pulse width characteristics, in which the first driving pulse group of $P_1$ to $P_8$ prepared by the first pulse preparation circuit 7 and the second driving pulse group of $P_7$ to $P_{14}$ prepared by the second pulse preparation circuit 17 are shown together with the minimum driving pulses of the respective driving pulses. The driving pulses $P_1$ to $P_{14}$ are plotted along the abscissa, and the voltages are plotted along the ordinate.

Referring to FIG. 9, the first driving pulse group consists of eight driving pulses including the driving pulse $P_1$ having the largest pulse width to the driving pulse $P_8$ having the smallest pulse width while gradually decreasing the pulse width. C represents the minimum driving voltages of the first driving pulse group $P_1$ to $P_8$, which cover a low voltage range from an operation threshold voltage $V_{L1}$ to a switching voltage $V_{SL}$.

The second driving pulse group also consists of eight driving pulses including the driving pulse $P_7$ having a pulse width larger by one level than that of the driving pulse $P_8$ having the smallest pulse width in the first driving pulse group to the driving pulse $P_{14}$ having the smallest pulse width while gradually decreasing the pulse width. D represents the minimum driving voltages of the second driving pulse group of $P_7$ to $P_{14}$, which cover a voltage range higher than that of the first driving pulse group, i.e., from the switching voltage $V_{SL}$ to a maximum charge voltage $V_{MAX}$.

As described above, in this embodiment, an operation as a timepiece is enabled within a voltage range from the operation threshold voltage $V_{L1}$ to the maximum charge voltage $V_{MAX}$. A minimum driving voltage curve E obtained by continuously coupling the minimum driving voltages of the first driving pulse group and the second driving pulse group respectively represented by C and D represents minimum driving voltages capable of driving the stepping motor 13 with the respective driving pulse. For example, a minimum driving voltage $V_{P1}$ for the driving pulse $P_1$ is about 1 V. A minimum driving voltage $V_{P8}$ for the boundary driving pulse $P_8$ positioned near the boundary between the first driving pulse group and the second driving pulse group is slightly lower than 1.8 V. A minimum driving voltage $V_{P14}$ for the driving pulse $P_{14}$ having the smallest pulse width is slightly lower than the maximum charge voltage $V_{MAX}$ (2.6 V).

A curve F shown in FIG. 9 represents abnormality generation voltages which cause abnormal phenomena such as a two-second skip or return by a reaction of the stepping motor with the respective driving pulses. For example, an abnormality generation voltage $V_{01}$ for the driving pulse $P_1$ is about 2.3 V. An abnormality generation voltage $V_{03}$ for the driving pulse $P_3$ is slightly lower than the maximum charge voltage $V_{MAX}$. Abnormality generation voltages $V_{04}$, $V_{05}$, . . . for the driving pulses $P_4$, $P_5$, . . . exceed the maximum charge voltage $V_{MAX}$.

Driving of the stepping motor of the electronic timepiece of this embodiment with the first and second driving pulse groups will be described below.

An operation performed when the electric double layer capacitor constituting the power supply for the electronic timepiece is charged from an unchanged state, and the voltage increases as indicated by $V_U$ in FIG. 1 to reach the maximum charge voltage $V_{MAX}$ of 2.6 V will be described.

While the power supply voltage is low, the first driving pulse group is selected. When the power supply voltage reaches the operation threshold voltage $V_{L1}$, driving of the stepping motor 13 is started with the driving pulse $P_1$ having the largest pulse width. In accordance with an increase in power supply voltage, the pulse width of the driving pulse supplied to the driver circuit 11 gradually decreases in the order of $P_2$, $P_3$, . . . When the power supply voltage exceeds the switching voltage $V_{SL}$ during driving with the boundary driving pulse $P_8$, the first driving pulse group is switched to the second driving pulse group. The driving pulse selected from the second driving pulse group at this time is the boundary driving pulse $P_8$ which has been selected so far from the first driving pulse group. Thereafter, in accordance with an increase in power supply voltage, the driving pulse is switched in the order of $P_9$, $P_{10}$, . . . , and $P_{14}$.

As for an operation performed when the charge to the electric double layer capacitor is stopped, and a power supply voltage $V_D$ gradually decreases as shown in FIG. 1, the pulse width of the driving pulse selected from the second driving pulse group gradually decreases in the order of $P_{14}$, $P_{13}$, . . . , contrary to the above-described charging state. When the power supply voltage decreases below a minimum driving voltage $V_{P9}$ for the driving pulse $P_9$ during driving with the driving pulse $P_9$, the driving pulse is switched to $P_8$. When the power supply voltage further decreases below the switching voltage $V_{SL}$, the second driving pulse group selected state is switched to the first driving pulse group selected state. The driving pulse selected from the first driving pulse group at this time is the boundary driving pulse $P_8$. Thereafter, a driving pulse according to the power supply voltage is selected from the first driving pulse group.

In this embodiment, the first driving pulse group and the second driving pulse group overlap at the switching point while the boundary driving pulse $P_8$ having the same pulse width and the driving pulse $P_7$ having a pulse width larger by one level are shared.

The reason why the boundary driving pulse $P_8$ is continuously selected when the first driving pulse group and the second driving pulse group are switched will be described below.

As conditions for switching the driving pulse from the first driving pulse group to the second driving pulse group in accordance with an increase in power supply voltage, a case wherein the overlap structure is not formed unlike the embodiment will be considered. More specifically, the two driving pulse groups do not share the driving pulse having the same pulse width, the driving pulse having the smallest pulse width in the first driving pulse group is defined as $P_8$, and the driving pulse having the largest pulse width in the second driving pulse group is defined as $P_9$. In this case, when the power supply voltage exceeds the switching voltage $V_{SL}$ during driving with the driving pulse $P_8$ in the first driving pulse group, the first driving pulse group is switched to the second driving pulse group, and the driving pulse $P_9$ is selected from the second driving pulse group. However, since the minimum driving voltage $V_{P9}$ for the driving pulse $P_9$ is higher than the switching voltage $V_{SL}$, driving with the driving pulse $P_9$ is disabled. The compensation driving pulse is output, and the stepping motor is driven with this compensation driving pulse. Thereafter, a pair of the driving pulse $P_9$ and the compensation driving pulse are output to continuously drive the stepping motor, resulting in an increase in current consumption. This can be improved by employing the overlap structure as in this embodiment wherein the boundary driving pulse is shared by the first driving pulse group and the second driving pulse group. In this embodiment, the overlapping driving pulses also include the driving pulse $P_7$ in addition to the driving pulse $P_8$. The reason for this will be described later.

The driving pulse output operation of the electronic timepiece of this embodiment will be described below in more detail step by step with reference to FIG. 6. In the following description, the switching voltage $V_{SL}$ between the first driving pulse group and the second driving pulse group is set to 1.8 V.

(1) Assume that a reset operation is performed when the output voltage of the electric double layer capacitor 2 constituting the power supply for the electronic timepiece, i.e., the power supply voltage is 1.5 V. The voltage detection circuit 3 determines that the power supply voltage is smaller than 1.8 V, i.e., the switching voltage $V_{SL}$ of the driving pulse group and causes the pulse group selection circuit 10 to select a driving pulse output from the first pulse selection circuit 8. The first pulse selection circuit 8 selects, in accordance with a signal from the reset switch 9, the driving pulse $P_1$ having a pulse width of 4.5 ms from the driving pulses $P_1$ to $P_8$ prepared by the first pulse preparation circuit 7 and outputs the driving pulse $P_1$. As is apparent from FIG. 9 and Table 2, the power supply voltage of 1.5 V has an excessively large driving force with respect to the driving pulse $P_1$. Therefore, the stepping motor 13 is rotated. The rotation detection circuit 12 detects the rotation state and outputs a rotation detection signal to the first pulse selection circuit 8. Upon reception of the rotation detection signal, the first pulse selection circuit 8 continuously outputs the driving pulse $P_1$. The driving pulse $P_1$ is continuously output for 200 seconds, and then switched to the driving pulse $P_2$ having a pulse width smaller by one level. This operation is repeated a number of times. By sequentially switching to a driving pulse having a smaller pulse width, the driving pulse $P_6$ is finally set, which enables driving at a power supply voltage of 1.5 V and a minimum current consumption. After driving with the driving pulse $P_6$ for 200 seconds, the first pulse selection circuit 8 switches the driving pulse to the driving pulse $P_7$ having a pulse width smaller by one level. However, when the driving pulse $P_7$ is output at a power supply voltage of 1.5 V, only a small driving force can be obtained, so the stepping motor 13 cannot be driven. The rotation detection circuit 12 detects the non-rotation state of the stepping motor 13 and outputs a non-rotation detection signal to the first pulse selection circuit 8. The first pulse selection circuit 8 immediately outputs the compensation driving pulse FIG. 7*e* having a pulse width of 8 ms which is sufficiently large to drive the stepping motor 13, and the next driving pulse is switched to the driving pulse $P_6$ having a pulse width larger by one level than that of the driving pulse $P_7$ so far. Thereafter, the similar operation is repeated a number of times to output the driving pulse $P_6$ for minimizing the current consumption for 200 seconds. During this time, one driving pulse $P_7$ and one compensation driving pulse are output. Although the current consumption of the compensation driving pulse is large, it is only output every 200 seconds and poses no problem.

As described above, a driving pulse suitable for the power supply voltage can be output to maintain a small current consumption.

(2) A case wherein the reset operation is performed when the power supply voltage is 2.2 V will be described below.

The voltage detection circuit 3 determines that the voltage of the electric double layer capacitor 2, i.e., the power supply voltage is 1.8 V or more and causes the pulse group selection circuit 10 to select the second driving pulse group output from the second pulse selection circuit 18. The second pulse selection circuit 18 selects, in accordance with a signal from the reset switch 9, the driving pulse $P_8$ from the second driving pulse group prepared by the second pulse preparation circuit 17 and outputs the driving pulse $P_8$. The pulse group selection circuit 10 outputs the driving pulse $P_8$ to the stepping motor 13 through the driver circuit 11. As is apparent from FIG. 9 and Table 3, the power supply voltage of 2.2 V has an excessively large driving force with respect to the driving pulse $P_8$. Therefore, the stepping motor 13 is rotated. The rotation detection circuit 12 detects the rotation state and outputs a rotation detection signal to the second pulse selection circuit 18. Upon reception of the rotation detection signal, the second pulse selection circuit 18 continuously outputs the driving pulse $P_8$. The driving pulse $P_8$ is continuously output for 200 seconds, and then switched to the driving pulse $P_9$ having a pulse width smaller by one level. This operation is repeated a number of times. By sequentially switching each driving pulse to a driving pulse having a smaller pulse width than the preceding driving pulse, the driving pulse $P_{12}$ is finally set, which enables driving at a power supply voltage of 2.2 V and a minimum current consumption. After driving with the driving pulse $P_{12}$ for 200 seconds, the second pulse selection circuit 18 switches the driving pulse to the driving pulse $P_{13}$. However, when the driving pulse $P_{13}$ is output at a power supply voltage of 2.2 V, only a small driving force can be obtained, so the stepping motor 13 cannot be driven. The rotation detection circuit 12 detects the non-rotation state of the stepping motor 13, and outputs a non-rotation detection signal to the second pulse selection circuit 18. The second pulse selection circuit 18 immediately outputs the compensation driving pulse FIG. 8*c* having a pulse width of 5 ms which is sufficiently large to drive the stepping motor 13, and the next driving pulse is switched to the driving pulse $P_{12}$ having a pulse width larger by one level. This operation is repeated a number of times to output the driving pulse $P_{12}$ for minimizing the current consumption for 200 seconds. During this time, one driving pulse $P_{13}$ and one compensation driving pulse are output. Although the current consumption of the compensation driving pulse is large, it is only output every 200 seconds and poses no problem.

As described above, a driving pulse suitable for the power supply voltage can be output to maintain a small current consumption.

(3) A case wherein the power supply voltage varies not to exceed 1.8 V, i.e., the switching voltage $V_{SL}$ of the first and second driving pulse groups will be described below.

A case wherein the power supply voltage increases to 1.7 V during driving with the driving pulse $P_6$ at a power supply voltage of 1.5 V will be described. As is apparent from Table 2, the driving pulse for minimizing the current consumption at a power supply voltage of 1.7 V is the driving pulse $P_7$. The driving pulse $P_6$ is an excessively large driving pulse. After the driving pulse $P_6$ is output at 1.5 V for 200 seconds, the first pulse selection circuit 8 switches the driving pulse $P_6$ to the driving pulse $P_7$.

To the contrary, assume that the power supply voltage decreases from 1.5 V to 1.4 V. The driving pulse for minimizing the current consumption at 1.4 V is the driving pulse $P_5$, as is apparent from Table 2, and driving is disabled with the driving pulse $P_6$. When the voltage decreases, and the stepping motor 13 cannot be driven with the driving pulse $P_6$, the compensation driving pulse having a pulse width of 8 ms is output at that point of time, and the driving pulse is switched to the driving pulse $P_5$ at the time of output of the next driving pulse.

In this manner, a change in pulse width of the output driving pulse can cope with the varying power supply voltage. The first driving pulse group of $P_1$ to $P_8$ are prepared to cope with the power supply voltage range of 1.0 to 1.8 V.

The driving pulse output operation at a power supply voltage smaller than 1.8 V has been described above. The same operation as described above is performed when the power supply voltage is 1.8 V or more. In this case, the second driving pulses $P_7$ to $P_{14}$ are prepared to cope with the power supply voltage range of 1.8 to 2.6 V. The same operation can cope with not only variations in voltage but also variations in load such as calendar updating.

(4) A case wherein the power supply voltage varies beyond 1.8 V, i.e., the switching voltage $V_{SL}$ of the driving pulse groups will be described below.

A case wherein the power supply voltage changes from 1.75 V to 1.8 V will be described. When the power supply voltage is 1.75 V, the voltage detection circuit 3 determines that the power supply voltage is smaller than 1.8 V and causes the pulse group selection circuit 10 to select a driving pulse output from the first pulse selection circuit 8. As is apparent from FIG. 9 and Table 2, when the power supply voltage is 1.74 to 1.85 V, the driving pulse for minimizing the current consumption is the driving pulse $P_8$. Therefore, the first pulse selection circuit 8 selects the driving pulse $P_8$ from the first driving pulse group prepared by the first pulse preparation circuit 7 and outputs the driving pulse $P_8$. Assume that the power supply voltage increases from this state. Until 1.8 V is reached, the voltage detection circuit 3 determines that the power supply voltage is smaller than 1.8 V, and the first pulse selection circuit 8 continuously selects the driving pulse $P_8$ from the first driving pulse group prepared by the first pulse preparation circuit 7 and outputs the driving pulse $P_8$. When the power supply voltage reaches 1.8 V, the voltage detection circuit 3 determines that the power supply voltage is 1.8 V or more and causes the pulse group selection circuit 10 to select the second driving pulse group output from the second pulse selection circuit 18. When a signal from the voltage detection circuit 3 is switched, the second pulse selection circuit 18 sets the output driving pulse to the driving pulse $P_8$. For this reason, even when the power supply voltage increases to 1.8 V, and the driving pulse output from the second pulse selection circuit 18 is selected, the driving pulse $P_8$ is continuously output. Therefore, no compensation driving pulse for increasing the current consumption is output, and switching is smoothly performed.

A case wherein the power supply voltage changes from 1.85 V to 1.8 V will be described.

When the power supply voltage is 1.85 V, the voltage detection circuit 3 determines that the power supply voltage is 1.8 V or more and causes the pulse group selection circuit 10 to select a driving pulse output from the second pulse selection circuit 18. As is apparent from FIG. 9 and Table 3, when the power supply voltage is 1.8 to 1.85 V, the driving pulse for minimizing the current consumption is the driving pulse $P_8$. The second pulse selection circuit 18 selects the driving pulse $P_8$ from the second driving pulse group prepared by the second pulse preparation circuit 17 and outputs the driving pulse $P_8$. Assume that the power supply voltage decreases from this state. Until the power supply voltage reaches 1.8 V, the voltage detection circuit 3 determines that the power supply voltage is 1.8 V or more, and the second pulse selection circuit 18 continuously selects the driving pulse $P_8$ from the second driving pulse group prepared by the second pulse preparation circuit 17 and outputs the driving pulse $P_8$. When the power supply voltage becomes lower than 1.8 V, the voltage detection circuit 3 determines that the power supply voltage is lower than 1.8 V and causes the pulse group selection circuit 10 to select the driving pulse output from the first pulse selection circuit 8. When a signal from the voltage detection circuit 3 is switched, the first pulse selection circuit 8 sets the output driving pulse to the driving pulse $P_8$. For this reason, even when the power supply voltage reaches 1.8 V, and the driving pulse output from the first pulse selection circuit 8 is selected, the driving pulse $P_8$ is continuously output. Therefore, no compensation driving pulse for increasing the current consumption is output, and switching is smoothly performed.

As described above, the driving pulse output in switching power supply voltage is set to a driving pulse having a pulse width for enabling driving at a minimum current consumption at the switching voltage. With this arrangement, an increase in current consumption caused by the compensation driving pulse, or an increase in current consumption caused by an excessively large driving pulse can be prevented.

To cope with an increase in load of the stepping motor 13, which is caused by the calendar load, at a power supply voltage of 1.8 V, the second pulse preparation circuit 17 prepares the driving pulse $P_7$ having a sufficiently large driving force even at 1.8 V. Therefore, an increase in load at 1.8 V, which causes constant output of the compensation driving pulse and an increase in current consumption, can be prevented.

This will be described in more detail. When the present power supply voltage is 1.81 V, the second driving pulse group is selected, and the driving pulse $P_8$ is output.

Assume that a calendar load is generated. When the calendar load is generated, the minimum driving voltage normally increases by about 0.1 V. At a power supply voltage of 1.81 V, the load cannot be driven with the driving pulse $P_8$, and the compensation driving pulse is output. However, as far as the power supply voltage is 1.81 V, the driving pulse is not switched to the first driving pulse group. For this reason, the compensation driving pulse is output for about one hour, i.e., 3,600 seconds until the calendar load is finished, resulting in a waste in current consumption. In this embodiment, the driving pulse $P_7$ is also prepared in the second driving pulse group to avoid this waste. With the driving pulse $P_7$, the calendar load can be sufficiently driven even at a power supply voltage of 1.81 V, and the above waste in current consumption can be decreased.

A timing for detecting the power supply voltage by the voltage detection circuit 3 in this embodiment will be described below.

Figure 10:
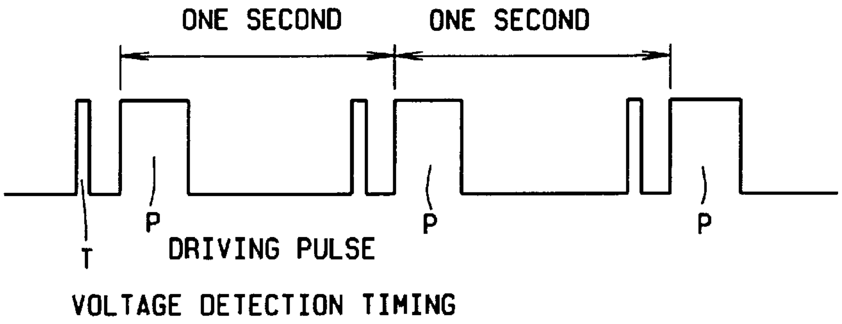
FIG. 10 is a timing chart showing a timing for detecting the voltage of a driving pulse.

FIG. 10 is a timing chart showing a driving pulse and a timing for detecting its voltage. Referring to FIG. 10, P represents a driving pulse, and T represents a timing for detecting the voltage of the driving pulse. The driving pulse P is output every second, and voltage detection is performed for each driving pulse P. To avoid abrupt variations in voltage, the voltage detection timing T is preferably set immediately before each driving pulse P is output.

Figure 11:
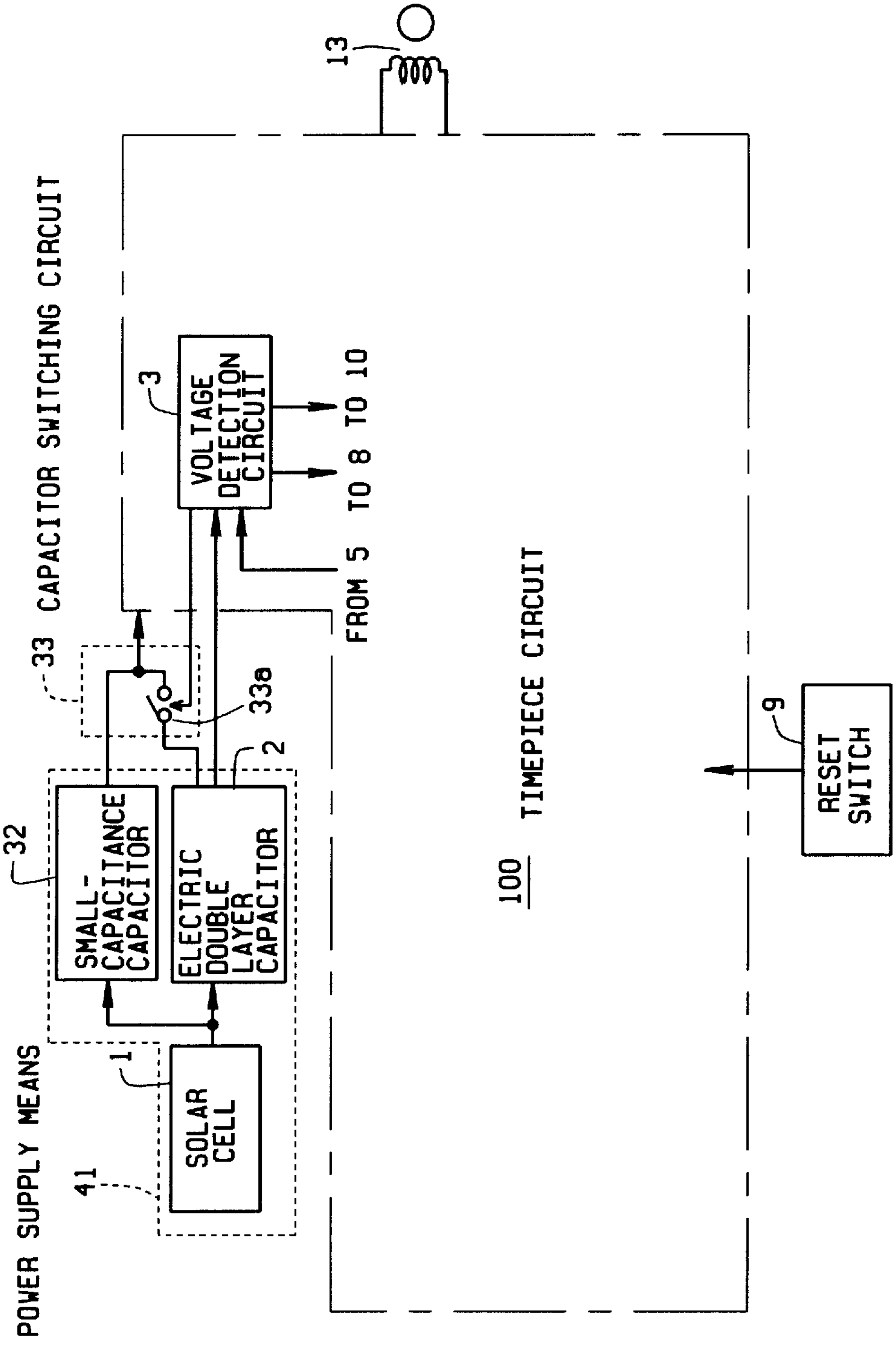
FIG. 11 is a block diagram showing the circuit arrangement of another embodiment of an electronic timepiece according to the present invention.

FIG. 11 is a block diagram of the circuit arrangement of another embodiment of an electronic timepiece according to the present invention.

In this embodiment, the present invention is applied to an electronic timepiece using a small-capacitance capacitor together with a large-capacitance electric double layer capacitor, thereby quickening the start of the operation of a solar timepiece. In place of the power supply means 40 in the embodiment shown in FIG. 6, a power supply means 41 consisting of a solar cell 1, and an electric double layer capacitor 2 and a small-capacitance capacitor 32 both of which are charged by the solar cell 1 is arranged. Additionally, a capacitor switching circuit 33 which switches between only the output voltage of the electric double layer capacitor 2 and both the output voltages of the small-capacitance capacitor 32 and the electric double layer capacitor 2 and supplies the voltage to a timepiece circuit 100 is arranged. The capacitor switching circuit 33 is switched in accordance with an output voltage from the electric double layer capacitor 2, which is detected by a voltage detection circuit 3. The circuit arrangement of the timepiece circuit 100 is the same as in the embodiment shown in FIG. 6, and a detailed illustration and description will be omitted.

Only an operation unique to this embodiment will be described below.

When neither the electric double layer capacitor 2 nor the small-capacitance capacitor 32 constituting the power supply means 41 is charged, the voltage detection circuit 3 determines that the output voltage of the electric double layer capacitor 2 is low and sets off a contact 33*a* of the capacitor switching circuit 33. When an optical energy is irradiated on the solar cell 1, the small-capacitance capacitor 32 is quickly charged because of its small capacitance and increases the output voltage. The electric double layer capacitor 2 is also charged, although the output voltage of the electric double layer capacitor 2 does not immediately increase because of its large capacitance. As a result, the contact 33*a* of the capacitor switching circuit 33 is kept in an OFF state, and only the output voltage from the small-capacitance capacitor 32 is applied to the timepiece circuit 100. That is, when light is irradiated on the solar cell 1 in a state wherein neither capacitor 2 nor 3 is charged, the timepiece can be immediately driven with the power from the small-capacitance capacitor 32. However, the capacitance of the small-capacitance capacitor 32 is small. For this reason, when the timepiece circuit 100 drives the stepping motor only once, the power accumulated in the small-capacitance capacitor 32 is consumed. The small-capacitance capacitor 32 is charged again until the next motion of the hand. This operation is repeated every second.

During this time, the electric double layer capacitor 2 is gradually charged and increases the output voltage. When the output voltage of the electric double layer capacitor 2 sufficiently becomes high, this state is detected by the voltage detection circuit 3. In accordance with a switching signal from the voltage detection circuit 3, the contact 33*a* of the capacitor switching circuit 33 in an OFF state is set on. As a result, the timepiece circuit 100 is driven with the power from both the electric double layer capacitor 2 and the small-capacitance capacitor 32. However, since the power from the small-capacitance capacitor 32 is considerably smaller than that from the electric double layer capacitor 2, the timepiece circuit 100 is actually driven with the power from the electric double layer capacitor 2.

The circuit operation of the timepiece circuit 100 is the same as in the embodiment shown in FIG. 6, and a detailed description thereof will be omitted.

The voltage detection circuit 3 detects not the output voltage of the small-capacitance capacitor 32 but only the output voltage of the electric double layer capacitor 2. This is because the voltage of the small-capacitance capacitor 32 immediately decreases after driving the stepping motor, though its output voltage is high, and cannot be used as a voltage for determining the driving pulse of the stepping motor. For this reason, no abnormal operation is caused during driving by the small-capacitance capacitor.

In the above two embodiments, an electronic timepiece using a power generation means using a solar cell has been described. However, the present invention is not limited to the solar cell and can also be applied to an electronic timepiece using a chargeable power generation means such as self-winding generation and temperature difference generation using no battery.

As has been described above, according to the present invention, in an electronic timepiece using a power supply means whose output voltage varies as a power supply, a plurality of driving pulse preparation means for preparing driving pulses for driving a stepping motor are arranged. Each driving pulse preparation means prepares a driving pulse group having a combination of pulse widths, which combination is different from that of the other driving pulse preparation means. A varying output voltage of the power supply means is detected, and one of the plurality of driving pulse preparation means is selected in accordance with the detected output voltage. A driving pulse for minimizing the current consumption is selected and supplied to the drive circuit of the stepping motor. With this arrangement, the stepping motor can always be driven at a minimum current consumption, and the driving time can be increased.

INDUSTRIAL APPLICABILITY

The electronic timepiece according to the present invention can be used for a long time as a solar timepiece free from troublesome battery exchange.

I claim:

1. An electronic timepiece having power supply means constituted by power generation means and accumulation means for accumulating a power generated by said power generation means, a stepping motor, a driver circuit for outputting a drive signal to said stepping motor, rotation detection means for detecting a rotation state or a non-rotation state of said stepping motor, and driving pulse preparation means for preparing a driving pulse output to said driver circuit and outputting a compensation driving pulse when the non-rotation state is detected by said rotation detection means, said driving pulse preparation means preparing a plurality of driving pulses having different pulse widths, characterized by comprising voltage detection means for detecting a voltage of said power supply means, wherein said driving pulse preparation means consists of a plurality of driving pulse preparation means, each driving pulse preparation means having pulse group selection means for preparing a driving pulse group having a combination of pulse widths, which combination is different from that of remaining ones of the driving pulse preparation means, and selectively connecting said plurality of driving pulse preparation means to said driver circuit, and a selection operation of said pulse group selection means is controlled in accordance with an output signal from said voltage detection circuit.

2. An electronic timepiece according to claim 1, characterized in that said plurality of driving pulse preparation means have first driving pulse preparation means selected when a voltage detected by said voltage detection means is lower than a predetermined value, and second driving pulse preparation means selected when the detected voltage is higher than the predetermined value.

3. An electronic timepiece according to claim 2, characterized in that each of said first driving pulse preparation means and said second driving pulse preparation means has a combination in which the pulse widths of the driving pulses continuously change, and the combination of the pulse widths of the driving pulses prepared by said first driving pulse preparation means and the combination of the pulse widths of the driving pulses prepared by said second driving pulse preparation means continuously change.

4. An electronic timepiece according to claim 3, characterized in that the combination of the pulse widths of the driving pulses prepared by said first driving pulse preparation means and the combination of the pulse widths of the driving pulses prepared by said second driving pulse preparation means include boundary driving pulses having the same pulse width.

5. An electronic timepiece according to claim 4, characterized in that the predetermined value serving as a reference for said pulse group selection means to switch said first driving pulse preparation means and said second driving pulse preparation means is set to a level near a limit voltage capable of driving said stepping motor with the pulse width of the boundary driving pulse.

6. An electronic timepiece according to claim 5, characterized in that a driving pulse output first when said first driving pulse preparation means is switched to said second driving pulse preparation means, or said second driving pulse preparation means is switched to said first driving pulse preparation means on the basis of the voltage detected by said voltage detection means is the boundary driving pulse.

7. An electronic timepiece according to claim 6, characterized in that said first driving pulse preparation means and said second driving pulse preparation means further share at least one driving pulse having a pulse width larger than that of the boundary driving pulse.

8. An electronic timepiece according to claim 7, characterized in that a change rate of the pulse widths of the driving pulses prepared by said first driving pulse preparation means and a change rate of the pulse widths of the driving pulses prepared by said second driving pulse preparation means are substantially equal.

9. An electronic timepiece according to claim 8, characterized in that the change rate of the pulse widths of the driving pulses prepared by said first driving pulse preparation means and the change rate of the pulse widths of the driving pulses prepared by said second driving pulse preparation means are different.

10. An electronic timepiece according to claim 9, characterized in that the change rate of the pulse widths of the driving pulses prepared by said first driving pulse preparation means is higher than the change rate of the pulse widths of the driving pulses prepared by said second driving pulse preparation means.

11. An electronic timepiece according to claim 10, characterized in that the change rate of the pulse widths of the driving pulses prepared by said first driving pulse preparation means is twice the change rate of the pulse widths of the driving pulses prepared by said second driving pulse preparation means.

12. An electronic timepiece according to claim 2, characterized in that the predetermined value is smaller than an abnormality generation voltage for a driving pulse having the largest pulse width prepared by said first driving pulse preparation means.

13. An electronic timepiece according to claim 7, characterized in that the predetermined value is set to a substantial intermediate level of an operable voltage range where said electronic timepiece can be operated.

14. An electronic timepiece according to claim 1, characterized in that said accumulation means has a main accumulator and a small-capacitance capacitor for quick start, and said voltage detection means detects an output voltage of said main accumulator and output the detected voltage.

15. An electronic timepiece according to claim 1, characterized in that said power generation means is a solar cell.

16. An electronic timepiece according to claim 2, characterized in that the compensation driving pulse prepared by said first driving pulse preparation means and the compensation driving pulse prepared by said second driving pulse preparation means have different pulse widths.

17. An electronic timepiece according to claim 16, characterized in that the compensation driving pulse prepared by said first driving pulse preparation means has a pulse width larger than that of the compensation driving pulse prepared by said second driving pulse preparation means.

18. In an electronic timepiece including a power generator configured for generating a varying output voltage that does not exceed a maximum voltage and at least a first pulse preparation circuit for preparing a first plurality of driving pulses, at least one of said driving pulses having an abnormal operation voltage less than said maximum voltage, said timepiece operating abnormally when said at least one driving pulse is selected and said output voltage is substantially equal to said abnormal operation voltage, said timepiece being configured to prevent selection of said at least one driving pulse when the output voltage of said power generator is substantially equal to said abnormal operation voltage.

19. The timepiece of claim 18 further including a second pulse preparation circuit for preparing a second plurality of driving pulses and a pulse group selection circuit configured for selecting one of said driving pulses prepared by said first and second pulse preparation circuits based on the value of said output voltage.

20. The timepiece of claim 19 further comprising a voltage detection circuit for detecting the value of said output voltage.

21. The timepiece of claim 20 further comprising a first pulse selection circuit for selecting one of the driving pulses prepared by said first pulse preparation circuit, and a second pulse selection circuit for selecting one of the driving pulses prepared by said second pulse preparation circuit, wherein said pulse group selection circuit is configured for selecting the driving pulse selected by one of the first and second pulse selection circuits based on the value of said output voltage.

22. The timepiece of claim 21 wherein said pulse group selection circuit is configured for selecting the driving pulse selected by the first pulse selection circuit when the value of said output voltage is less than a predetermined value, and for selecting the driving pulse selected by the second pulse selection circuit when the value of said output voltage is greater than said predetermined value.

23. The timepiece of claim 22 wherein each driving pulse prepared by said first pulse preparation circuit has an abnormal operation voltage, and said predetermined value is less than said abnormal operation voltages.

24. The timepiece of claim 23 further including a motor, wherein each driving pulse of said first plurality has a pulse width different from other driving pulses of said first plurality, each driving pulse of said second plurality has a pulse width different from other driving pulses of said second plurality, and said first and second pulse selection circuits are configured for selecting driving pulses having pulse widths smaller than previously selected driving pulses when said motor is rotating.

25. The timepiece of claim 24 wherein a difference between the pulse widths of successive driving pulses in said first plurality is twice as great as a difference between the pulse widths of successive driving pulses in said second plurality.

26. The timepiece of claim 24 wherein said first plurality includes a boundary pulse having a pulse width smaller than the other driving pulses of said first plurality, and said second plurality includes a driving pulse having a pulse width substantially equal to said boundary pulse.

27. The timepiece of claim 26 wherein said boundary pulse has a minimum driving voltage substantially equal to said predetermined value.

28. The timepiece of claim 26 wherein said second plurality includes a driving pulse having a pulse width larger than said boundary pulse and a minimum driving voltage less than said predetermined value.

29. The timepiece of claim 28 further including a reset switch, wherein said first pulse selection circuit is configured for selecting when said timepiece is reset the driving pulse from said first plurality having a largest pulse width, and said second pulse selection circuit is configured for selecting when said timepiece is reset the driving pulse from said second plurality having the pulse width substantially equal to said boundary pulse.

30. The timepiece of claim 24 wherein said first pulse preparation circuit is configured for preparing a first compensation pulse, said second pulse preparation circuit is configured for preparing a second compensation pulse, and said first and second pulse selection circuits are configured for selecting said first and second compensation pulses, respectively, when said motor is not rotating.

31. The timepiece of claim 30 wherein said first compensation pulse has a larger pulse width than said second compensation pulse.

32. The timepiece of claim 18 wherein said power generator is selected from the group consisting of solar generators, kinetic energy generators, and thermal difference generators.

33. The timepiece of claim 22 wherein the pulse width of the driving pulse selected by the first pulse selection circuit when said output voltage decreases to a value less than said predetermined value is substantially equal to the pulse width of the driving pulse selected by the second pulse selection circuit when said output voltage increases to a value greater than said predetermined value.

* * * * *